United States Patent [19]
Jacobson

[11] Patent Number: 4,842,347
[45] Date of Patent: Jun. 27, 1989

[54] GLOVE BOX FOR REMOVAL OF HAZARDOUS WASTE FROM PIPES

[76] Inventor: Earl B. Jacobson, 510 S. Shore Dr., Crystal Lake, Ill. 60014

[21] Appl. No.: 189,611

[22] Filed: May 3, 1988

[51] Int. Cl.⁴ .............................................. B65D 30/2
[52] U.S. Cl. ...................................... 312/1; 15/227; 313/3
[58] Field of Search ................ 312/1, 3, 5, 6, 283; 280/770; 224/42.42, 42.45 R, 42.46 R; 15/227, 345; 134/6, 10, 21, 42; 138/97

[56] References Cited

U.S. PATENT DOCUMENTS

| | | | |
|---|---|---|---|
| 1,967,632 | 7/1934 | Simonson | 312/3 X |
| 2,972,353 | 2/1961 | Quest | 312/1 |
| 2,977,956 | 4/1961 | Smith et al. | 312/1 X |
| 4,327,760 | 5/1982 | Lancaster | 312/1 X |
| 4,485,490 | 12/1984 | Akers et al. | 312/1 X |
| 4,626,291 | 12/1986 | Natale | 312/1 X |
| 4,746,175 | 5/1988 | Hamlet et al. | 312/3 X |

FOREIGN PATENT DOCUMENTS

| | | | |
|---|---|---|---|
| 1188191 | 6/1985 | Canada | 312/1 |
| 1567270 | 5/1980 | United Kingdom | 312/1 |
| A2157822 | 10/1985 | United Kingdom | 312/1 |

Primary Examiner—Kenneth J. Dorner
Assistant Examiner—Thomas A. Rendos
Attorney, Agent, or Firm—Silverman, Cass, Singer & Winburn, Ltd.

[57] ABSTRACT

An improved glove box hazardous waste removal system especially for confining pipes, including a pair of semi-rigid side walls securable at one edge to one another to form a rigid cylindrical unit. The box includes sealable sleeves on each end thereof, sealable to the pipe being confined. The side walls include a flexible skirt attached to the opposite edge and including a sealable bottom opening on the skirt. The skirt includes an attachment structure for attaching disposable burial bags thereto.

20 Claims, 2 Drawing Sheets

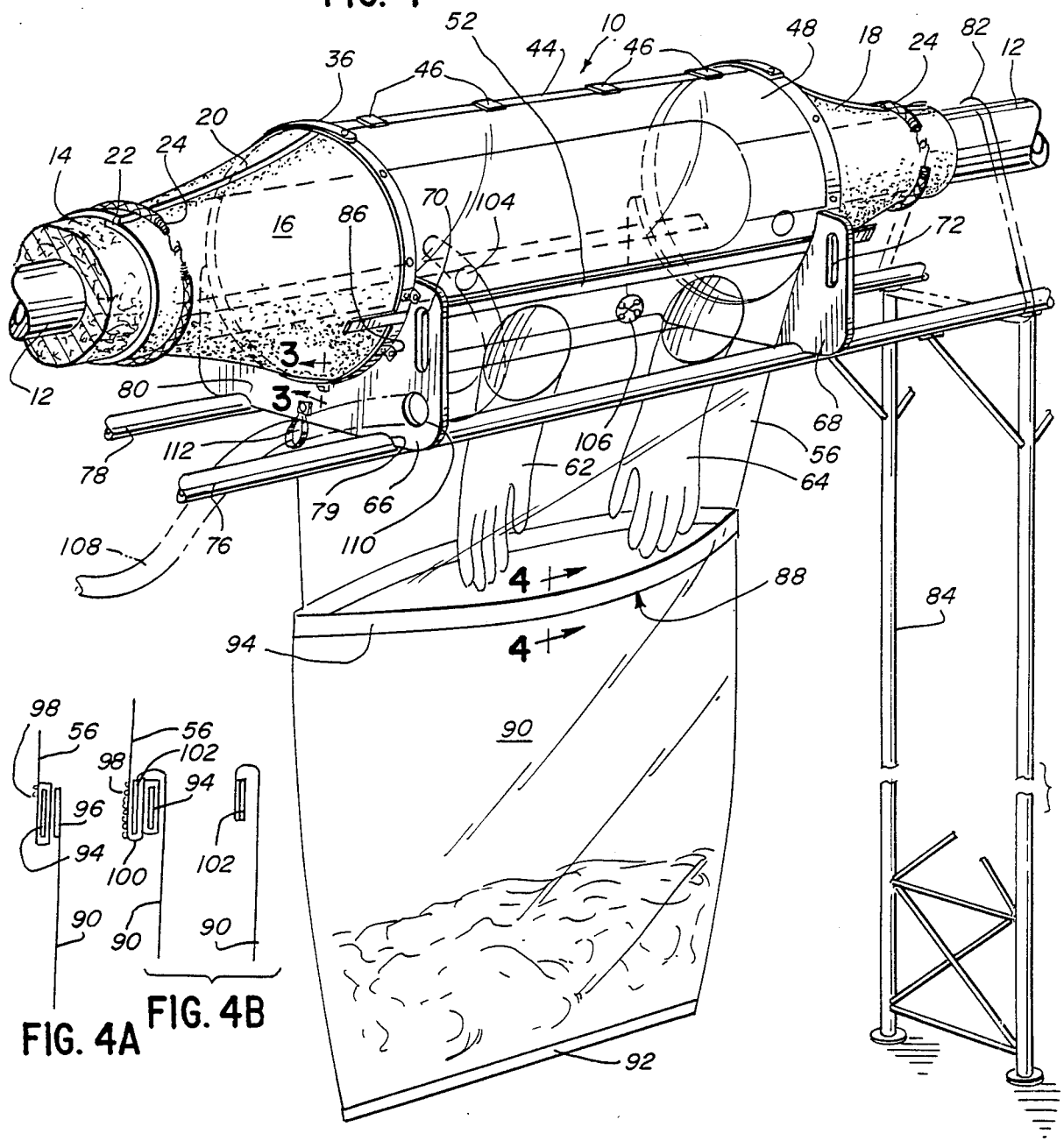
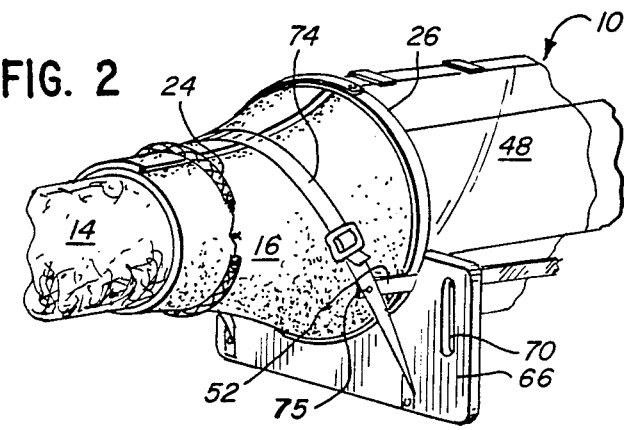

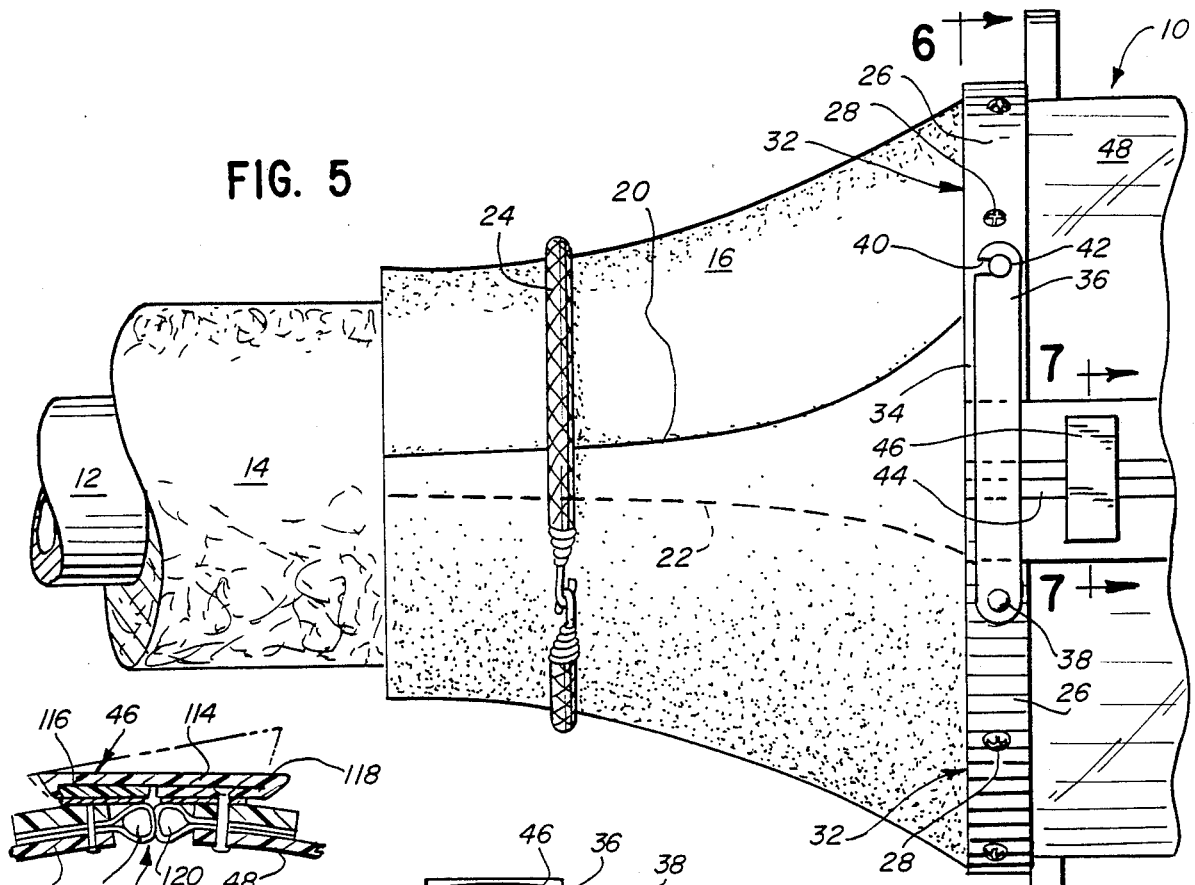
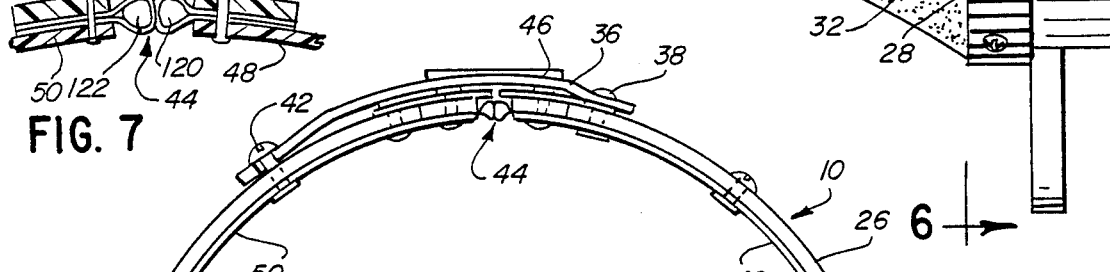
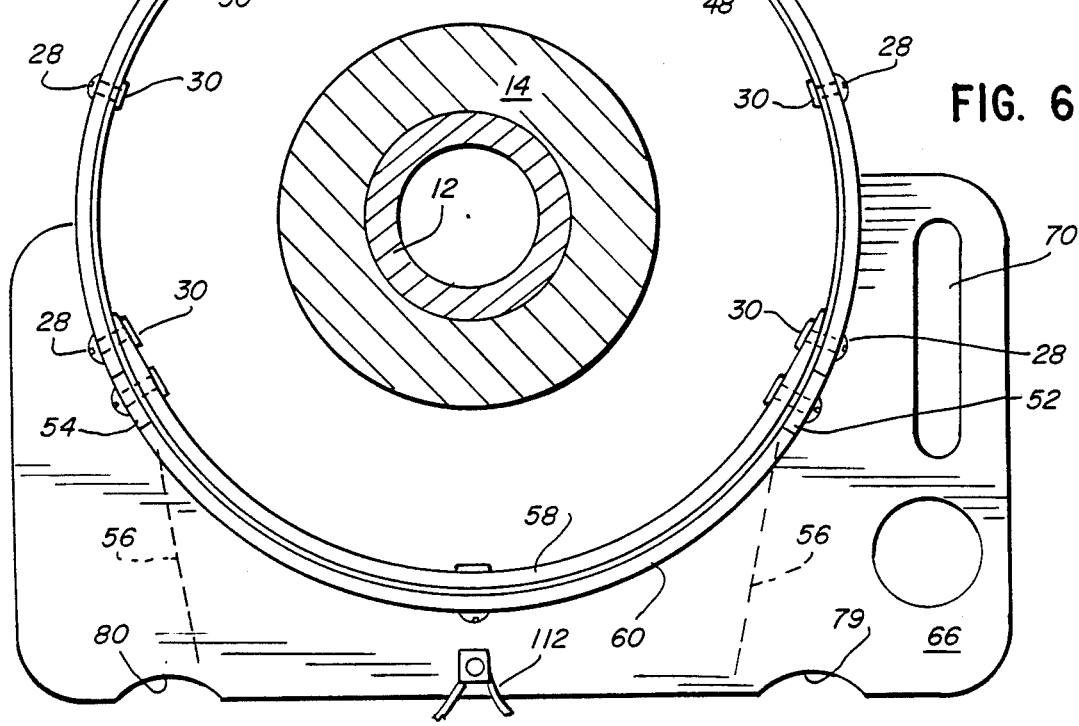

GLOVE BOX FOR REMOVAL OF HAZARDOUS WASTE FROM PIPES

BACKGROUND OF THE INVENTION

The invention relates generally to hazardous waste removal systems and more particularly to an improved glove box removal system for removing hazardous wastes, such as asbestos insulation in a defined area, especially on hot or cold pipes.

Numerous prior art glove bag waste removal systems have been utilized for a considerable period of time for removing waste from a closely defined work area in which the contaminants or hazardous wastes are confined. The worker is protected from the wastes since the wastes are confined inside of the system and the worker works in the system but avoid direct contact with the wastes by utilizing the well-known glove bag concept.

One particular application for glove bag waste removal systems is in removing coatings or insulation from pipes which material is or contains asbestos. The prior art glove bags are secured and sealed around the pipes at the tops of the bags, such as by wrapping the open ends of the bag top around the pipe and taping the openings shut. The bags are utilized to remove the asbestos material and are then removed from the pipe and sealed for disposal. Typically, the bags are placed in a second bag for disposal.

The bags frequently are made from polymers, which do not give sufficient strength in all uses. Also, the polymer bags have a bottom seal which can rupture. Wrapping and upwrapping the tops of the bag onto and from the pipe can cause a poor seal or release of the asbestos materials from the bag. The bags are utilized under negative pressure and typically include one or more openings for vacuum lines and for water spray lines or nozzles for wetting down the material as an extra safety precaution. These openings can be the cause of additional asbestos leaks. The bags often also contain an internal tool pouch, which generally is open at the top which catches the waste.

Two somewhat related glove bag waste removal systems and applications are disclosed in application Ser. No. 1,074, entitled "Hazardous Waste Glove Bag Removal System" and Ser. No. 1,075, entitled "Glove Bag Waste Removal System For Asbestos Impregnated Brakes", both filed Jan. 7, 1987, the disclosures of which are incorporated herein by reference.

A number of the prior polymer constructed glove bag waste systems are intended for a single use, although Applicant's above-referenced systems are both reusable. It would be desirable to provide a waste removal system, which has the advantages of the disposable glove bag system, but also has a structure which is durable, can withstand high temperatures and provides significant reusability.

SUMMARY OF THE INVENTION

The above and other disadvantages of prior art hazardous waste glove bag removal systems and techniques are overcome in accordance with the present invention by providing an improved hazardous waste box, which easily is mounted and removed from pipes while protecting the worker from release of the hazardous materials. The box has a pair of upper, generally optically clear, flexible, but rigid walls which are mounted to be opened for placing over the pipe and the box can be moved along the pipe.

The box includes insulating securing sleeves which are sealable over a wide variety of pipe sizes. When the box is secured and sealed to the pipe, it forms a structure which is integrally maintained under slightly negative pressure conditions. The box is mounted onto the pipe by means which are adjustable to provide a clearance work space over the top of the pipe. The box walls are formed to include a bottom opening and has a flexible skirt depending therefrom integrally formed with the upper walls. The skirt includes a bottom sealable opening to which waste burial bags are removably attached.

The box flexible skirt includes at least one glove sleeve and at least one self-sealing access sleeve for contamination free access to the interior of the box by vacuum or water spray probes. The box includes a top flexible opening member which accommodates pipe hanging structures.

The box can include an internal self-closing tool pouch to avoid water and waste entry therein. The flexible skirt of the box preferably is made from heavy gauge, optically clear, or reinforced translucent polyvinyl (PVC) material.

BRIEF DESCRIPTION OF THE DRAWINGS

FIG. 1 is a perspective view of a pipe with a first embodiment of the improved glove box hazardous waste removal system of the invention mounted thereon;

FIG. 2 is a partial perspective view of a pipe with a second embodiment of the improved glove bag hazardous waste removal system of the invention mounted thereon;

FIG. 3 is a side sectional view of a mounting bracket of the system of the invention taken along the lines 3—3 in FIG. 1;

FIGS. 4A and 4B are partial side sectional views of embodiments of the disposal bag mounting of the invention taken along lines 4—4 of FIG. 1;

FIG. 5 is a partial side view of the system of FIG. 1;

FIG. 6 is an end sectional view of the system of FIG. 5 taken along line 6—6 therein; and FIG. 7 is a partial side sectional view illustrating a closure of the system of FIG. 5 taken along the line 7—7 therein.

DESCRIPTION OF THE PREFERRED EMBODIMENTS

Referring to FIG. 1, a first embodiment of the improved glove box hazardous waste removal system of the invention is designated generally by the reference character 10. The box 10 is illustrated mounted onto a pipe 12, which pipe generally will have a hazardous material most generally asbestos, covering 14 thereon, such as for insulation. The box 10 is designed to be moved along the pipe 12 for repairing the pipe 12 and/or to remove the hazardous waste/insulation 14 therefrom.

To facilitate the installation, sliding and removal of the box 10 on or from the pipe 12, the box 10 includes a pair of sealable, preferably insulating, securing end sleeves 16 and 18. The securing sleeves 16 and 18 are sized to accommodate a range of bare pipes 12, such as illustrated by the sleeve 18 and also with the insulation 14 thereon as illustrated by the sleeve 16. The securing end sleeves 16 and 18 are substantially identical and therefor only end sleeve 16 will be discussed in detail.

The sleeve 16 is formed from a flexible material, such as a rubber, latex or foam material, and is formed in the shape of a cone with a pair of free edges 20 and 22. The particular shape and material of the sleeve 16 is not critical, as long as the sleeve 16 can be opened for the box 10 to be placed over the pipe 12 and to enable the box 10 to be moved along the pipe 12 as the insulation 14 is removed therefrom.

The overlapping edges 20 and 22 of the sleeve 16 are sealed against one another when the sleeve 16 is secured. The rubber or latex sleeve material preferably is removable to fit pipe sizes in a wider size range and is formed of a material which can withstand the temperatures in hot pipe applications. The prior polymer formed glove bags have a low melting temperature and cannot withstand high temperatures. The sleeve 16 also can be two overlapping flexible panels.

The sleeves 16 and 18 can be secured around the pipe 12 and the insulation 14 by one or more suitable, preferably elastic or adjustable, securing straps 24. The strap 24 also could be a conventional drawstring attached to the sleeves 16 and 18. The straps 24 also may not be required since the rubber or latex sleeve material can seal against itself. The operation of the sleeve 16 is best illustrated in FIG. 5, wherein the overlapping ends 20 and 22 are reversed from that illustrated in FIG. 1.

The sleeve 16 can be attached to the box 10 by an end band 26. The band 26 preferably is removably secured to the box 10 by a plurality of threaded bolts 28, each of which includes an internally threaded stud 30 (FIG. 6) to securely clamp the box elements together. One end 32 of the sleeve 16 is secured to the box 10 by the band 26, including the end portion of the covered free end 22. The free end 20 of the sleeve 16, however, includes a portion 34 which extends beyond the secured end 32 and is free from the band 26 and secured to an arm 36. The sleeve 16 also can be attached to the box 10 by sewing through the box material, as will be described hereinafter. Further, the sleeve 16 can be attached by a zipper (not illustrated), sewn or otherwise, to attach the box 10.

The arm 36 can be pivotably mounted onto the band 26 and hence to the box 10, such as by a bolt 38, as illustrated. The opposite end of the arm 36 can include a notch or other securing means 40, which can be snapped over a bolt 42 to secure the overlapping free end 20 over the underlying end 22. The orientation of the ends 20 and 22 and hence the arm 36 can be reversed as illustrated in FIG. 1. The arm 36 also can just be a flexible piece and can be bent back to provide a sufficient opening.

The sleeve 16 thus is easily secured around the pipe 12 and the insulation 14 by the strap 24 and the arm 36. The sleeve 16 is opened to move or remove or to place the box 10 onto the pipe 12 by releasing and pivoting the arm 36 toward the end 22 and removing the strap 24.

Referring again to FIG. 1, the box 10 includes a top opening 44, which can be secured and released by a plurality of releasable fasteners 46. The fasteners 46 can be a molded draw latch, such as sold by Southco, Inc., Concordville, PA 19331. The opening and closing of the box 10 will be described hereinafter with respect to FIGS. 5-7.

The box 10 preferably is formed from optically clear or substantially clear materials to provide unlimited viewing access into the interior of the box 10 by the worker removing the insulation 14 or otherwise working on the pipe 12. As best illustrated in FIGS. 1 and 6, the box 10 includes a pair of semirigid arcuate, substantially optically clear, side walls 48 and 50 which are bent over and secured at the opening 44 by the fasteners 46. One of a pair of support bars 52 and 54 is secured to the bottom of each side wall 48 and 50 and to provide rigidity to the upper box structure. The support bars 52 and 54 are utilized to clamp an open ended flexible skirt 56 to the side walls 48 and 50. The skirt 56 also is fastened to the end of the box 10 by at least a pair of end clamping bands 58 and 60. The band 58 is clamped to the side walls 48 and 50 and to the support bars 52 and 54 by the bolts 28 and studs 30. The band 58 can be flatter than illustrated, to provide a wider top opening in the skirt 56.

The skirt 56 preferably is formed from a heavy gauge, on the order of twenty (20), optically clear or translucent reinforced PVC material have sufficient strength and body to support a pair of glove sleeves 62 and 64 therein. The glove sleeves 62 and 64 are formed in the flexible skirt 54 to provide better movement thereof and to locate the sleeves below the axis of the pipe 12 for the convenience of the worker. The worker can see into the box 10 through the walls 48, 50.

The box 10 preferably is mounted onto a pair of substantially identical rigid end boards 66 and 68, only one of which, 66, will be described. The end boards 66 and 68 add rigidity to the structure of the box 10 and further can provide handles 70 and 72 to aid in lifting and moving the box 10. The box 10 can be mounted onto the pipe 12 and the insulation 14 by an adjustable hanging strap 74, as illustrated in FIG. 2. The strap 74 preferably is connected to an end 75 of the support bar 52. By utilizing the strap 74, the position of the box 10 can be adjusted to provide the desired clearance above the pipe 12 and the insulation 14 so that the worker easily can work thereon through the glove sleeves 62 and 64.

The box 10 thus includes an upper substantially optically clear body including the walls 48 and 50 which forms a generally cylindrical sealed structure which has sufficient integrity to be reusable and to maintain its shape under the slightly negative operating pressure applied to the box 10. The upper body portion, including the sealing sleeves 16 and 18, can withstand hot temperatures from the pipes 12, which the polymer flexible skirt 56 and the prior polymer glove bags cannot withstand.

The box 10 also can be mounted on the pipe 12 by an adjustable pair of rails 76, 78, such as illustrated in FIG. 1. The end board 66 can include a mating pair of notches 79 and 80 which will sit onto the rails or pipes 76, 78. The height of the rails 76, 78 and hence the bag 10 can be adjusted by a plurality of straps 82 (only one of which is illustrated). The rails 76, 78 also can be mounted on standards 84 (only one of which is illustrated) which can themselves be adjustable. The rails 76, 78 preferably are of sufficient length for the box 10 to be moved into at least a second position, after the confined area of the first illustrated position has had the insulation 14 removed therefrom. The rails 76, 78 also can be utilized in conjunction with the strap 74, to only provide support for the box 10 when it is desired to release and move the box 10.

The securing of a top portion of the skirt 56 and the end board 66 is best illustrated in FIG. 3. The skirt 56 is clamped between the end bands 58 and 60, which are also secured to the end board 66 by an L-shaped bracket 86 and the bolts 28 and studs 30. Alternatively, the skirts 56 can be sewn to the board 66.

The bottom of the skirt 56 includes a sealing structure 88 to seal the bottom of skirt 56 and hence the box 10 to a disposable waste or burial bag 90. The bag 90 preferably can be a relatively cheap disposable polyethylene material which can have a conventional seam 92 at the bottom thereof or can be formed without the seam 92. The sealing structure 88 preferably includes a spring hinge member 94 formed in the bottom edge of the skirt 56, as best illustrated in FIGS. 4A and 4B.

The spring hinge member 94 can be formed of spring steel bands and can be of the pop open or closed type utilized in briefcases, such as sold by Leonardi Mfg. Co., Inc., Weedsport, N.Y. 13166. The spring hinge member 94 generally has two positions, one closed, with the bands together and a second open position, where the bands are locked into an elliptical shape by spring mechanisms at each end of the member 94. The hinge 94 preferably is a pair of bands hinged only at each end of the skirt 56, as illustrated in FIG. 1, or can have multiple side hinge pieces. The bag 90 is attached in one of several ways. The bag 90 can include a strip of tape 96 inside the top thereof, as illustrated in FIG. 4A. The closed hinge 94 is bent in an arc to insert the bag 90 therearound and then released to provide sufficient tension to hold the top of the bag 90 onto the skirt 56. To open the top of the bag 90, the spring hinge 94 is bowed outwardly into the open position and further applies tension to the bag 90. The tape 96 adheres to the skirt 56, further ensuring that the bag 90 is sealed thereto.

The inside of the skirt 56 can include a hook and eye arrangement 98 such as sold under the trademark Velcro to ensure that the skirt 56 is sealed when the bag 90, with waste material therein, is removed. The bag 90 preferably is just twisted at its top, tied and then cut free from the skirt 56. The remainder of the cutoff bag 90 then easily is removed from the sealed skirt 56, to ensure that no material leaks from the box 10, when the bags 90 are replaced or changed.

The spring hinge 94 also can be formed in an upturned edge 100 of the skirt 56 and can capture a plastic member 102 sealed or otherwise secured to the upper end of the bag 90 in a hook-type arrangement, as illustrated in FIG. 4B.

The box 10 includes at least one sealed vacuum inlet or sleeve 104 and at least one sealed access port or sleeve 106. The vacuum inlet preferably is formed in the semirigid wall 48 since a vacuum line 108 is merely attached thereto. The end board 66 can include an opening 110 into which the line 108 can be inserted and can include a strap 112 to secure the line 108 to the box 10. The vacuum line 108 maintains the interior of the box 10 at a negative pressure in a conventional manner to ensure that the airborne contaminants are captured and removed by the vacuum line, which is connected to a conventional filter unit (also not illustrated). The port 106 preferably is formed in the skirt 56 to provide flexibility for the worker in inserting and manipulating an air or water nozzle, not illustrated, but could also be formed in the wall 48.

The securing and releasing of the box 10 is best illustrated in FIGS. 5-7. Referring to FIG. 7, the fastener 46 includes a top or latch member 114 hingedly formed with a bottom piece 116. The piece 116 is secured to the wall 50. A separate bottom piece 118 forms a snap lock with the top member 114. The piece 118 is secured to the other wall 48 on the opposite of the opening 44. The opening 44 includes a pair of foam rubber or other flexible sealing members 120 and 122 attached to opposite walls 48 and 50, on opposite sides of the opening 44. The members 120 and 122 provide a vacuum seal when the opening 44 is closed, but also provide sufficient flexibility to accommodate pipe hangers or other pipe supports (not illustrated) sealingly therethrough. The members 120 and 122 and the fastener 46 could be replaced by a zipper (not illustrated) and the zipper or the members 120 and 122 also can be sewn to the walls 48 and 50.

When it is desired to move the box 10, the spring hinge 94 is closed and vacuum is continuously applied. Then the strap 24, if utilized, and the arm 36 are released and the sleeve ends 20 and 22 then are free to be separated. The fasteners 46 can be released if necessary to allow the walls 48 and 50 to spring slightly apart. Generally, the fasteners 46 would not need to be released and the unit 10 then can be moved on the rails 76 and 78 or by hand to the new position. When the box 10 is placed in the new position it is sealed into position in a reverse order. The fasteners 46 could be opened if a pipe hanging structure obstructs the movement.

Many modifications and variations of the present invention are possible in light of the above teachings. The skirt 56 can include a tool pouch if desired. The box 10 can be formed of any suitable material, but the elements 26, 48, 50, 52, 54, 58, 60, 66 and 68 preferably can be formed from a substantially clear plastic like material such as that sold under the trademark Lexan. The skirt 56 can be formed from PVC or other suitable material. The resulting box 10 is very lightweight. The end sealing sleeves 16, 18 also could be donut shaped foam pieces secured to the walls 48 and 50. The bolts 28 and studs 30 can be utilized, so the skirt 56 can be replaced, if necessary. The skirt 56 also can be sewn to the Lexan material. Also, this allows each of the elements easily to be replaced, such as sleeves 16 and 18, the walls 48, 50 or the skirt 56. It is, therefore, to be understood that within the scope of the appended claims, the invention may be practiced otherwise than as specifically described.

What is claimed and desired to be secured by Letters Patent of the United States is:

1. An improved reusable glove box hazardous waste removal system, adapted to be mounted onto and removed from pipes, comprising:

a sealable box unit including a pair of semirigid side walls having an opening along upper ends thereof, said box unit including means for opening and closing said opening to mount said box unit onto a pipe and at least one glove sleeve therein;

said side walls including a flexible skirt depending therefrom, said skirt including means for sealingly attaching a containment bag to an open end of said skirt and means for sealinging closing said skirt for attaching and removing said bag therefrom including a spring hinge member attached to said open end of said skirt, said member having a closed and an open position and said containment bag includes means for securing said bag to said spring hinge of said skirt; and said box including means for sealing the ends of said box onto said pipe.

2. The system as defined in claim 1 wherein said skirt includes said at least one glove sleeve therein.

3. The system as defined in claim 1 wherein at least one of said side walls includes a sealed vacuum opening therein.

4. The system as defined in claim 1 wherein said box unit includes means for adjustably mounting said unit onto said pipe.

5. The system as defined in claim 4 wherein said box unit includes a pair of rails to support said unit at least when said unit is to be moved along said pipe.

6. The system as defined in claim 1 wherein said bag securing means include a semirigid member for cooperating with said spring hinge end of said skirt.

7. The system as defined in claim 1 wherein said end sealing means include a sleeve formed of insulating material having a pair of overlapping free edges and means to secure said free edges over one another.

8. The system as defined in claim 7 wherein said means to secure include an arm mounted on said box unit and attached to a free end of one of said free edges to secure one free edge over the other.

9. The system as defined in claim 1 wherein said opening includes flexible means for sealingly accommodating pipe hanging structures therethrough.

10. An improved reusable glove box hazardous waste removal system, adapted to be mounted onto and removed from pipes, comprising:
a sealable box unit including a pair of semirigid side walls having an opening along upper ends thereof, said box unit including means for opening and closing said opening to mount said box unit onto a pipe and at least one glove sleeve therein;
said side walls including a flexible skirt depending therefrom, said skirt including means for sealingly attaching a containment bag to an open end of said skirt and means for sealinging closing said skirt for attaching and removing said bag therefrom; and
said box including means for sealing the ends of said box onto said pipe including a sleeve formed of insulating material having a pair of overlapping free edges and means to secure said free edges over one another including an arm mounted on said box unit and attached to a free end of one of said free edges to secure one free edge over the other.

11. An improved reusable glove box hazardous waste removal system, adapted to be mounted onto and removed from pipes, comprising:
a sealable box unit including a pair of semirigid substantially optically clear side walls having an opening along upper ends thereof, said box unit including means for opening and closing said opening to mount said box unit onto a pipe and at least one of said side walls includes a sealed vacuum opening therein, said sealed box unit forming a substantially cylindrical rigid unit;
said side walls including a flexible skirt depending therefrom with at least one glove sleeve therein, said skirt including means for sealingly attaching a containment bag to an open end of said skirt and means for sealinging closing said skirt for attaching and removing said bag therefrom, said skirt closing means including a spring hinge member attached to said open end of said skirt, said member having a closed and an open position and said containment bag including means for securing said bag to said spring hinge of said skirt; and
said box including means for sealing the ends of said box onto said pipe.

12. The system as defined in claim 11 wherein said box unit includes means for adjustably mounting said unit onto said pipe.

13. The system as defined in claim 12 wherein said box unit includes a pair of rails to support said unit at least when said unit is to be moved along said pipe.

14. The system as defined in claim 11 wherein said bag securing means include a semirigid member for cooperating with said spring hinge end of said skirt.

15. The system as defined in claim 11 wherein said end sealing means include a sleeve formed of insulating material having a pair of overlapping free edges and means to secure said free edges over one another.

16. The system as defined in claim 11 wherein said means to secure include an arm mounted on said box unit and attached to a free end of one of said free edges to secure one free edge over the other.

17. The system as defined in claim 11 wherein said opening includes flexible means for sealingly accommodating pipe hanging structures therethrough.

18. An improved reusable glove box hazardous waste removal system, adapted to be mounted onto and removed from pipes, comprising:
a sealable box unit including a pair of semirigid substantially optically clear side walls having an opening along upper ends thereof, said box unit including means for opening and closing said opening to mount said box unit onto a pipe and at least one of said side walls includes a sealed vacuum opening therein, said sealed box unit forming a substantially cylindrical rigid unit;
said side walls including a flexible skirt depending therefrom with at least one glove sleeve therein, said skirt including means for sealingly attaching a containment bag to an open end of said skirt and means for sealinging closing said skirt for attaching and removing said bag therefrom; and
said box including means for sealing the ends of said box onto said pipe including a sleeve formed of insulating material having a pair of overlapping free edges and means to secure said free edges over one another including an arm mounted on said box unit and attached to a free end of one of said free edges to secure one free edge over the other.

19. An improved reusable glove box hazardous waste removal system, adapted to be mounted onto and removed from pipes, comprising:
a sealable non-collapsible box unit including a pair of semirigid flexible, optically clear substantially planar side wall sheets curved into a U-shape forming an opening along upper ends thereof, said box unit including means for opening and closing said opening when said sheets are bent together to form a substantially cylindrical shape to mount said box unit onto a pipe and at least one glove sleeve therein;
said side walls including a flexibe skirt depending therefrom, said skirt including means for sealingly attaching a containment bag to an open end of said skirt and means for sealinging closing said skirt for attaching and removing said bag therefrom; and
said box including means for sealing the ends of said box onto said pipe.

20. An improved reusable glove box hazardous waste removal system, adapted to be mounted onto and removed from pipes, comprising:
a sealable box unit including a pair of semirigid side walls having an opening along upper ends thereof, said box unit including means for opening and closing said opening to mount said box unit onto a pipe and at least one glove sleeve therein;

said side walls including a flexible skirt depending therefrom, said skirt including means for biasing said skirt open and means for sealingly attaching a containment bag to an open end of said skirt, said sealing means including an inverted hem on an outside lower edge of said skirt and means to retain an upper edge of said containment bag in said inverted hem, and means for sealinging closing said skirt for attaching and removing said bag therefrom; and said box including means for sealing the ends of said box onto said pipe.

* * * * *